(12) United States Patent
Neild et al.

(10) Patent No.: US 12,317,173 B1
(45) Date of Patent: May 27, 2025

(54) METHOD OF OPERATING A WIRELESS TELECOMMUNICATIONS NETWORK

(71) Applicant: British Telecommunications Public Limited Company, London (GB)

(72) Inventors: Ian Neild, London (GB); Andrew Reeves, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/868,099

(22) PCT Filed: Apr. 14, 2023

(86) PCT No.: PCT/EP2023/059799
§ 371 (c)(1),
(2) Date: Nov. 21, 2024

(87) PCT Pub. No.: WO2023/227288
PCT Pub. Date: Nov. 30, 2023

(30) Foreign Application Priority Data

May 26, 2022 (EP) .................................... 22175623

(51) Int. Cl.
*H04W 48/10* (2009.01)
*H04W 84/12* (2009.01)

(52) U.S. Cl.
CPC ............ *H04W 48/10* (2013.01); *H04W 84/12* (2013.01)

(58) Field of Classification Search
None
See application file for complete search history.

(56) References Cited

U.S. PATENT DOCUMENTS

| 7,200,112 | B2* | 4/2007 | Sundar .................... H04L 69/18 370/230 |
| 7,277,547 | B1 | 10/2007 | Delker et al. |

(Continued)

FOREIGN PATENT DOCUMENTS

| CN | 104093164 A | 10/2014 |
| CN | 204168311 U | 2/2015 |

(Continued)

OTHER PUBLICATIONS

Combined Search and Examination Report for GB2207757.2 dated Oct. 31, 2022 (5 pages).

(Continued)

*Primary Examiner* — Hong S Cho
(74) *Attorney, Agent, or Firm* — Nixon & Vanderhye P.C.

(57) ABSTRACT

A method (400) of operating a wireless telecommunications network (100), said network comprising a plurality of User Equipment (110), UEs, a Wireless Access Point (120), WAP, and a Wireless Local Area Network (140), WLAN, provided by means of the WAP, the method comprising the steps of: associating, against each of the plurality of UEs, an item of information and a unique character slot for the item of information (410); compiling each item of information into a string, wherein said items of information are arranged according to each associated character slot (420); broadcasting, by means of the WAP, a network identifier for the WLAN, said network identifier comprising the compiled string (430); identifying, by means of each of the UEs, the broadcast network identifier (440); retrieving, by means of each UE, the character slot for the associated UE; and using, by means of each UE, the retrieved character slot so as to extract the associated item of information from the identified network identifier.

18 Claims, 4 Drawing Sheets

(56) References Cited

U.S. PATENT DOCUMENTS

| | | |
|---|---|---|
| 8,315,615 B2 | 11/2012 | Kalhan |
| 8,737,363 B2 | 5/2014 | Ozluturk |
| 8,949,120 B1 | 2/2015 | Every et al. |
| 10,009,955 B2 | 6/2018 | Zhang et al. |
| 10,292,027 B2 | 5/2019 | Goluboff |
| 10,298,581 B2 | 5/2019 | Shah et al. |
| 10,334,438 B2 | 6/2019 | Iyer et al. |
| 10,635,133 B2 | 4/2020 | Begley |
| 2004/0253969 A1 | 12/2004 | Nguyen et al. |
| 2005/0286456 A1* | 12/2005 | McNew ............... H04W 48/12 370/312 |
| 2008/0198823 A1 | 8/2008 | Shiu et al. |
| 2008/0220741 A1 | 9/2008 | Hung |
| 2010/0309815 A1 | 12/2010 | Gabriel et al. |
| 2013/0103807 A1 | 4/2013 | Couto et al. |
| 2015/0050906 A1 | 2/2015 | Yuasa |
| 2016/0087811 A1* | 3/2016 | Yin ..................... H04W 48/16 370/312 |
| 2016/0249287 A1 | 8/2016 | Xie et al. |
| 2017/0019390 A1 | 1/2017 | Gu |
| 2017/0055315 A1 | 2/2017 | Lin |
| 2017/0245234 A1 | 8/2017 | Bradish |
| 2017/0347359 A1 | 11/2017 | Yang et al. |
| 2018/0176771 A1 | 6/2018 | Yang et al. |
| 2018/0376448 A1 | 12/2018 | Wild et al. |
| 2020/0037134 A1 | 1/2020 | Wheeler |
| 2020/0275466 A1 | 8/2020 | Hodroj |
| 2021/0185612 A1* | 6/2021 | Song ............... H04W 52/0235 |
| 2021/0315010 A1 | 10/2021 | Hsu et al. |
| 2021/0400443 A1 | 12/2021 | Wheeler |

FOREIGN PATENT DOCUMENTS

| | | |
|---|---|---|
| CN | 104796888 A | 7/2015 |
| CN | 104869612 A | 8/2015 |
| CN | 104981000 A | 10/2015 |
| CN | 105764050 A | 7/2016 |
| CN | 105792315 A | 7/2016 |
| CN | 106304409 A | 1/2017 |
| CN | 106572465 A1 | 4/2017 |
| CN | 106847264 A | 6/2017 |
| CN | 107529205 A | 12/2017 |
| CN | 108391238 A | 8/2018 |
| CN | 108834137 A | 11/2018 |
| CN | 109547266 A | 3/2019 |
| CN | 110366229 A | 10/2019 |
| CN | 110460995 A | 11/2019 |
| CN | 110557305 A | 12/2019 |
| CN | 110730043 A | 1/2020 |
| CN | 112738867 A | 4/2021 |
| DE | 102021134386 A1 | 9/2022 |
| EP | 1576444 A0 | 9/2005 |
| EP | 1871072 A1 | 12/2007 |
| EP | 3122144 A1 | 1/2017 |
| EP | 3576444 A1 | 12/2019 |
| EP | 3664491 A1 | 6/2020 |
| GB | 2552016 A | 1/2018 |
| GB | 2607948 A | 12/2022 |
| JP | 2013222993 A | 10/2013 |
| JP | 2015104017 A | 6/2015 |
| JP | 2017194891 A | 10/2017 |
| KR | 20100048986 A | 5/2010 |
| KR | 101964983 B1 | 4/2019 |
| KR | 101980039 B1 | 5/2019 |
| WO | 2004059450 A1 | 7/2004 |
| WO | 2009016368 A2 | 2/2009 |
| WO | 2015063146 A1 | 5/2015 |
| WO | 2016180062 A1 | 11/2016 |
| WO | 2018227715 A1 | 12/2018 |
| WO | 2019048857 A1 | 3/2019 |
| WO | 2019233311 A1 | 12/2019 |
| WO | 20200066627 A1 | 4/2020 |
| WO | 2022067274 A1 | 3/2022 |

OTHER PUBLICATIONS

Combined Search and Examination Report for GB2108742.4 Dated Dec. 2, 2021 (7 pages).
Combined Search and Examination Report for GB2116053.6 Dated Apr. 19, 2022 (7 pages).
Combined Search and Examination Report for GB2201522.6 Dated Jul. 20, 2022 (5 pages).
Combined Search and Examination Report for GB2301541.5 Dated Feb. 20, 2023 (4 pages).
Further Exam Report for GB2201522.6 dated Sep. 30, 2022 (2 pages).
Combined Search & Exam Report for GB2104045.6 dated Jul. 6, 2021 (5 pages).
Intention to Grant for GB2116063.6 dated Sep. 24, 2024 (2 pages).
Internatinal Search Report and the Written Opinion for PCT/EP2023/059799 Dated Jul. 7, 2023 (13 pages).
International Preliminary Report on Patentability for PCT/EP2022/054265 dated Oct. 5, 2023 (10 pages).
International Preliminary Report on Patentability for PCT/EP2023/050572 dated Aug. 22, 2024 (11 pages).
International Preliminary Report On Patentability for PCT/EP2022/062584 Dated Dec. 28, 2023 (7 pages).
International Preliminary Report On Patentability for PCT/EP2022/078200 Dated May 23, 2024 (12 pages).
International Search Report & Written Opinion for PCT/EP2022/062584 dated Sep. 8, 2022 (10 pages).
International Search Report & Written Opinion for PCT/2023/050572 dated Apr. 11, 2023 (17 pages).
The Examination Report for GB2116053.6 Dated Sep. 12, 2024 (3 pages).
The Extended European Search Report for EP22175623.2 Dated Nov. 21, 2022 (8 pages).
The International Search Report and the Written Opinion for PCT/EP2022/054265 Dated Jul. 11, 2022 (16 pages).
The International Search Report and the Written Opinion for PCT/EP2022/078200 Dated Feb. 7, 2023 (17 pages).
WiLink 8 WLAN Features User's Guide, Texas Instruments, Literature No. SWRU423A, Jul. 2015—Revised May 2016 (44 pages).
International Preliminary Report on Patentability dated Dec. 5, 2024, issued for International Application No. PCT/EP2023/059799 (8 pages).

* cited by examiner

METHOD OF OPERATING A WIRELESS TELECOMMUNICATIONS NETWORK

CROSS-REFERENCE TO RELATED APPLICATIONS

This application is the U.S. national phase of International Application No. PCT/EP2023/059799 filed Apr. 14, 2023 which designated the U.S. and claims priority to EP 22175623.2 filed May 26, 2022, the entire contents of each of which are hereby incorporated by reference.

FIELD OF INVENTION

The present invention relates to a method of operating a wireless telecommunications network, and to portions thereof, and to a telecommunications network, and to components thereof.

BACKGROUND

Wireless Access Points (WAPs) may facilitate data connectivity between a wide area network (e.g. a fixed-access broadband network) and wireless communication devices (herein also referred to as "User Equipment", UE). To do so, WAPs provide Wireless Local Area Networks (WLANs) that work over a radio frequency spectrum with low transmit power, typically providing a range of several meters. A WLAN is available to be provided according to any one of the IEEE® 802.11 family of standards (which form the basis for Wi-Fi®).

A UE is available to connect to WLANs provided by the WAP. However, in order for the UE to connect to a WLAN, the UE must first identify the WAP providing the WLAN, as well as identify the WLAN. For example, in the case of a Wi-Fi-based WLAN, a Service Set IDentifier (SSID) may be used to identify a WLAN, in which a WAP will normally publicly broadcast the SSID. When broadcast, these SSIDs can be viewed by all devices in the locality.

A large number of UEs are available to connect to a WAP, and these UEs may be managed by a remote Device Management System (DMS) that is provided as part of: the WAP; the wide area network; and/or a remote device accessible via the wide area network. Such management is in particular desirable for UEs having resource and practical constraints (e.g. battery, physical accessibility, and low compute resources), such as Internet of Things (IoT) devices.

To securely manage a UE remotely, an authenticated connection may be established between a UE and the DMS, via the WLAN. The DMS can then communicate instructions directly, and serially, to each UE via the WLAN. For example, communicating ten different instructions to ten different UEs would require the WAP serially transmitting the ten instructions to each of the UEs, with each transmission occupying radio resources. Given an envisaged increase in the number of UEs requiring management by a DMS, this existing process may suffer, at least, from poor scalability.

It is therefore an aim of the present invention to at least alleviate this aforementioned problem.

STATEMENTS OF INVENTION

According to a first aspect of the present invention, there is provided: a method of operating a wireless telecommunications network, said network comprising a plurality of User Equipment, UEs, a Wireless Access Point, WAP, and a Wireless Local Area Network, WLAN, provided by means of the WAP, the method comprising the steps of: associating, against each of the plurality of UEs, an item of information and a unique character slot for the item of information; compiling each item of information into a string, wherein said items of information are arranged according to each associated character slot; broadcasting, by means of the WAP, a network identifier for the WLAN, said network identifier comprising the compiled string; identifying, by means of each of the UEs, the broadcast network identifier; retrieving, by means of each UE, the character slot for the associated UE; and using, by means of each UE, the retrieved character slot so as to extract the associated item of information from the identified network identifier.

According to a another aspect of the present invention, there is provided: a method of operating a Wireless Access Point, WAP, for a wireless telecommunications network, said network comprising a plurality of User Equipment, UEs, and a Wireless Local Area Network, WLAN, provided by means of the WAP, the method comprising the steps of: receiving an association, against each of the plurality of UEs, between an item of information and a unique character slot for the item of information; compiling each item of information into a string, wherein said items of information are arranged according to each associated character slot; broadcasting, by means of the WAP, a network identifier for the WLAN, said network identifier comprising the compiled string, so that each UE, having retrieved, and by using, the character slot for the associated UE, extracts the associated item of information from the broadcast network identifier.

According to a further aspect of the present invention, there is provided: a method of operating User Equipment, UE, for a wireless telecommunications network, said network comprising a plurality of User Equipment, a Wireless Access Point, WAP, and a Wireless Local Area Network, WLAN, provided by means of the WAP, and the wireless telecommunications network being configured to: associate, against the, and each, UE, an item of information and a unique character slot for the item of information; compile each item of information into a string, wherein said items of information are arranged according to each associated character slot; and broadcast a network identifier for the WLAN, said network identifier comprising the compiled string; wherein the method comprises the steps of the UE: identifying the broadcast network identifier; retrieving the character slot associated with the UE; and using the retrieved character slot so as to extract the associated item of information from the identified network identifier.

Preferably, the, or each, UE extracts only the item of information associated therewith by using only the associated unique character slot.

Preferably, retrieving the character slot comprises receiving a communication specifying said character slot from the WAP and/or via the, or another, WLAN. Optionally, the communication is provided by the, or another, network identifier for the, or another, WLAN. Optionally, the character slot associated with a given one of the plurality of UEs is predefined in memory within said UE, and wherein the step of retrieving the character slot comprises accessing said memory so as to retrieve the associated character slot.

Preferably, each item of information associated with each of the UEs is different; that is, each item of information may be unique amongst the plurality of UEs, and each unique item of information is associated specifically, and only, with a given one of the UEs. Preferably, at least one, or each, item of information is secret. Preferably, at least one, or each, of the associations between the UEs and the character slots is secret.

Preferably, the network identifier comprises a given item of information in an encoded form suitable for decoding by the associated UE. Preferably, the encoded form is suitable for decoding only by the associated UE. Optionally, the encoded form is a one-time code.

Preferably, the method(s) further comprising: encrypting at least one of the items of information into an encrypted form, wherein the broadcast network identifier comprises said encrypted form; and decrypting said encrypted form by the associated UE so as to extract the associated item of information.

Preferably, the decryption is performed using a decryption key common to all of the plurality of UEs. Optionally, the decryption is performed using a decryption key that is unique to the, or each, UE. Optionally, the, or each, UE stores predefined information comprising the item of information associated with said UE/s, and wherein the step of retrieving the character slot for the associated UE comprises identifying the character slots of the network identifier that are decrypted to generate the item of information as stored in the predefined information.

Preferably, the item of information comprises an instruction for the UE/s. Preferably, the instruction is pre-defined or is communicated between the WAP and the plurality of UEs, and still more preferably via the, or another, WLAN. Preferably, the item of information is a unique instruction code (or identifier), which in turn refers to the instruction. Preferably, the instruction is an instruction for a UE not to perform an, or any, action and/or any changes in action. Preferably, the method further comprises the step of each UE executing only the instruction contained within the associated extracted item of information.

Preferably, the method is performed without the, or each, UE connecting, or being connected, to the, or any, WLAN. Optionally, the, or each, UE may be connected to another WLAN, which may be provided by the, or another, WAP. Optionally, at least one of the UEs is unable (optionally, ever) to connect, or forbidden from connecting, to the WLAN. Optionally, at least one of the UEs may connect to the WLAN, preferably having been authenticated by the WAP. Optionally, the WLAN provides no onward data connection for the, or each, UE to a wide area network accessible via the WAP.

Preferably, the network identifier is a Service Set Identifier. Optionally, the network identifier only consists of each item of information (or, optionally, a reversible derivative thereof). Optionally, the network identifier comprises a pre-defined code for causing (optionally, only upon identifying said pre-defined code in the network identifier) the, or each, UE to perform the step/s of retrieving the character slot and/or using the retrieved character slot so as to extract the associated item of information.

According to yet another aspect of the present invention, there is provided: a computer-readable carrier medium comprising a computer program, which, when the computer program is executed by a computer, causes the computer to carry out the steps of any one of the afore-described methods.

According to still a further aspect of the present invention, there is provided: a wireless telecommunications network comprising: a plurality of User Equipment, UEs; a processor configured to associate, against each of the plurality of UEs, an item of information and a unique character slot for the item of information; a Wireless Access Point, WAP, configured to: compile each item of information into a string, wherein said items of information are arranged according to each associated character slot; and broadcast a network identifier, said network identifier comprising the compiled string; a Wireless Local Area Network, WLAN, provided by means of the WAP and having the network identifier associated therewith; and wherein each of the plurality of UEs is further configured to: identify the broadcast network identifier; retrieve the character slot for the associated UE; and use the retrieved character slot so as to extract the associated item of information from the identified network identifier.

According to another aspect of the present invention, there is provided: a Wireless Access Point, WAP, for a wireless telecommunications network, said network comprising a plurality of User Equipment, UEs, and a Wireless Local Area Network, WLAN, provided by means of the WAP, the WAP comprising: a processor configured to: receive an association, against each of the plurality of UEs, between an item of information and a unique character slot for the item of information; and compile each item of information into a string, wherein said items of information are arranged according to each associated character slot; and a controller configured to: broadcast, by means of the WAP, a network identifier for the WLAN, said network identifier comprising the compiled string, so that each UE, having retrieved, and by using, the character slot for the associated UE, extracts the associated item of information from said broadcast network identifier.

According to a further aspect of the present invention, there is provided: User Equipment, UE, for operating within a wireless telecommunications network, said network comprising a plurality of UEs, a Wireless Access Point, WAP, and a Wireless Local Area Network, WLAN, provided by means of the WAP, and the wireless telecommunications network being configured to: associate, against the, and each, UE, an item of information and a unique character slot for the item of information; compile each item of information into a string, wherein said items of information are arranged according to each associated character slot; and broadcast a network identifier for the WLAN, said network identifier comprising the compiled string; and wherein the UE comprises: a processor configured to: identify the broadcast network identifier; retrieve the character slot associated with the UE; and use the retrieved character slot so as to extract the associated item of information from the identified network identifier.

As used herein, the term "User Equipment" is preferably not to be construed as being limited to usage in relation to cellular telecommunications, and may include any wireless network-enabled client device.

Optionally, the item of information comprises an ASCII symbol or is an ASCII string. Optionally, the item of information comprises a password and/or access credentials, and for example for accessing the wireless telecommunications network, and specifically for accessing the or another WLAN. Optionally, at least two of the associated character slots are of different lengths. Optionally, the length of a character slot is selected in dependence upon the associated: UE; and/or item of information, and in particular in dependence on a priority level of the item of information. Preferably, each of the character slots are non-overlapping. Optionally, at least two character slots are partially, but not wholly, overlapping.

Preferably, the items of information are arranged according to each associated character slot so that the position of the item of information in the string and network identifier matches (optionally, exactly) the character slot associated with the UE for which said item of information is allocated.

Optionally, at least two of the character slots are consecutive. Optionally, at least two of the character slots are separated by at least one intervening character having associated therewith no item of information. Optionally, a plurality of the unique character slots are associated with the, or one of the, UE/s. As used herein, a "character slot" preferably denotes a set of indexed positions (or character positions) within a string. As used herein, the term "unique" as applied to a character slot, preferably connotes a character slot having at least one character position allocated only to that character slot (i.e. an unshared character position); that is, partially, but not wholly, overlapping character slots may therefore be "unique".

Optionally, the indexed positions are consecutive, or comprise at least two consecutive positions. Optionally, the indexed positions are non-consecutive, or comprise at least two non-consecutive positions. Optionally, there is provided a further step of (optionally, the WAP) retrieving a unique identifier for each of the UEs, wherein each item of information is associated against each unique identifier. Optionally, the unique identifier is a: physical network address of the UE, and may be a Media Access Control (MAC) address. Optionally, each of the UEs are provided as part of a set of at least one UE, and wherein each set is associated with an item of information and a unique character slot.

Optionally, the step of associating, against each of the plurality of UEs, an item of information and a unique character slot is performed by a device remote from, and in communication with, the WAP.

Optionally, the item of information communicates a subsequent character slot, for use with a subsequent item of information, associated with the UE using the character slot to extract of the item of information. Preferably, each character slot has a length less than the string and/or network identifier.

The invention includes any novel aspects described and/or illustrated herein. The invention also extends to methods and/or apparatus substantially as herein described and/or as illustrated with reference to the accompanying drawings. The invention is also provided as a computer program and/or a computer program product for carrying out any of the methods described herein and/or for embodying any of the apparatus features described herein, and a computer-readable medium storing thereon a program for carrying out any of the methods and/or for embodying any of the apparatus features described herein. Features described as being implemented in hardware may alternatively be implemented in software, and vice versa.

Any apparatus feature may also be provided as a corresponding step of a method, and vice versa. As used herein, means plus function features may alternatively be expressed in terms of their corresponding structure, for example as a suitably-programmed processor.

Any feature in one aspect of the invention may be applied, in any appropriate combination, to other aspects of the invention. Any, some and/or all features in one aspect can be applied to any, some and/or all features in any other aspect, in any appropriate combination. Particular combinations of the various features described and defined in any aspects of the invention can be implemented and/or supplied and/or used independently.

As used throughout, the word 'or' can be interpreted in the exclusive and/or inclusive sense, unless otherwise specified.

The invention extends to a method of operating a wireless telecommunications network, a method of operating a Wireless Access Point, a method of operating User Equipment, User Equipment, a Wireless Access Point, and a wireless telecommunications network, as described herein and/or substantially as illustrated with reference to the accompanying drawings. The present invention is now described, purely by way of example, with reference to the accompanying diagrammatic drawings, in which:

SPECIFIC DESCRIPTION

Figure 1:
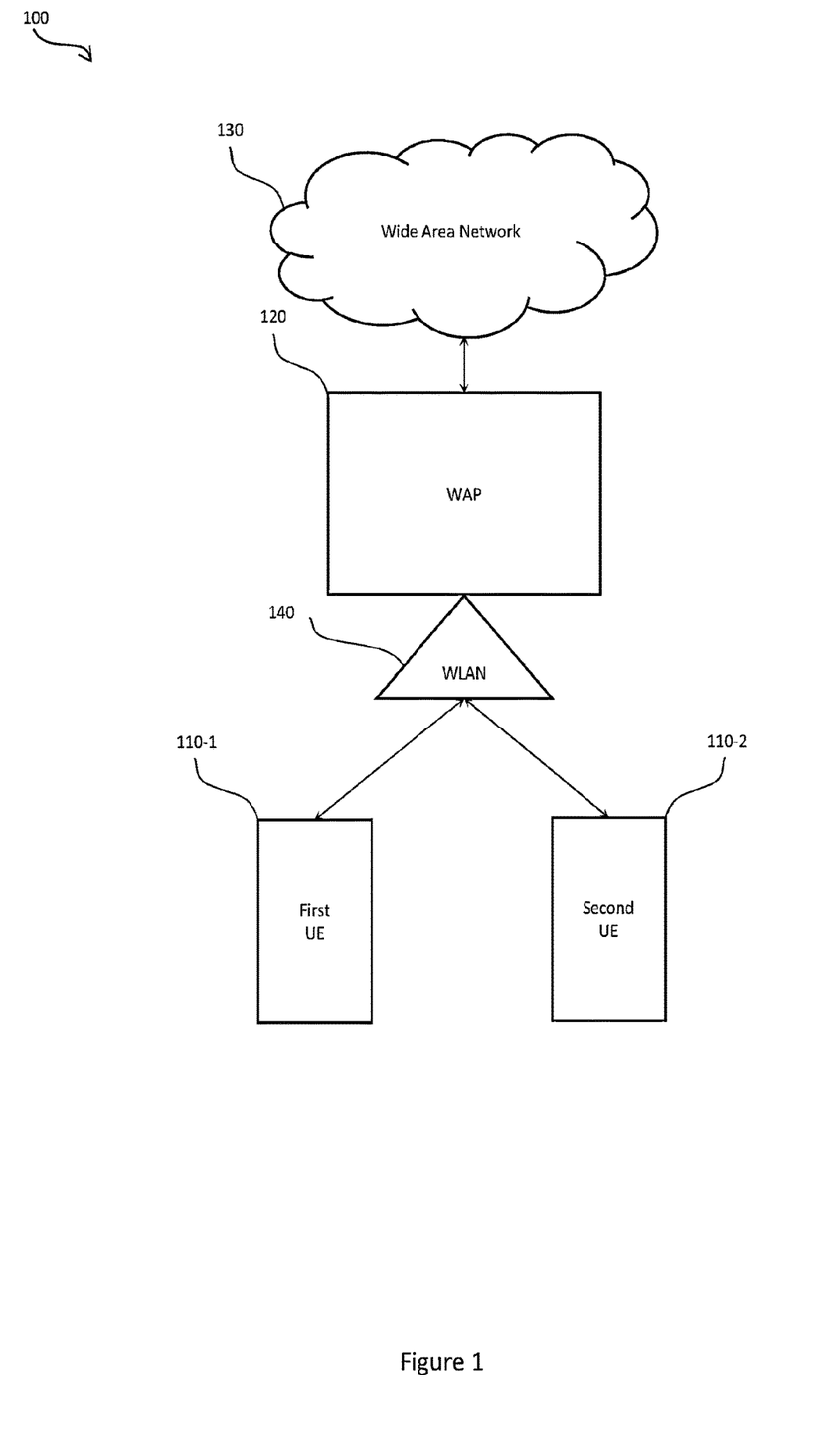
FIG. 1 is a schematic diagram of an exemplary wireless telecommunications network.

FIG. 1 shows an exemplary wireless telecommunications network 100, which comprises: a set of a plurality of wireless telecommunications devices (or User Equipment devices, UEs) 110; a Wireless Access Point (WAP) 120; and a wide area network 130.

The WAP 120 is configured to generate a Wireless Local Area Network (WLAN) 140, to which each of the UEs 110 is available to connect.

In one example, the WAP is a wireless router, gateway, edge device, extender and/or repeater, and the WLAN is available to operate based on any of the IEEE® 802.11 family of standards. The UEs are available to be in the form of any electronic communications device incorporating a WLAN interface, and in particular a/an: personal computer (laptop or desktop); mobile telecommunications device; Internet of Things (IoT) device; wireless repeater; and/or wireless extender.

The WAP 120 is connected (e.g. via an Ethernet connection) to the wide area network 130, which comprises, for example, a fixed-access broadband network and/or a cellular network. As a result, the UE 110 is available to connect, via the WLAN 140, to the wide area network 130, and in turn to, for example, the Internet.

The WAP 120 is configured to broadcast a network identifier that identifies the WLAN 140 to the UEs 110; this network identifier is in the form of a Service Set IDentification (SSID), which is a configurable text-based identifier. The length of each individual SSID is defined by standards. Typically, an SSID consists of up to 32 ASCII characters (alphanumeric, case-sensitive characters from the set of 256 ASCII characters, with some restrictions on the first character).

As shown in the example of FIG. 1, the total number of UEs in the set 110 is two, which are all located sufficiently proximate to the WAP 120 so as to be within wireless range of the WAP, and therefore the WLAN 140 is detectable and identifiable to the UEs.

Figure 2:
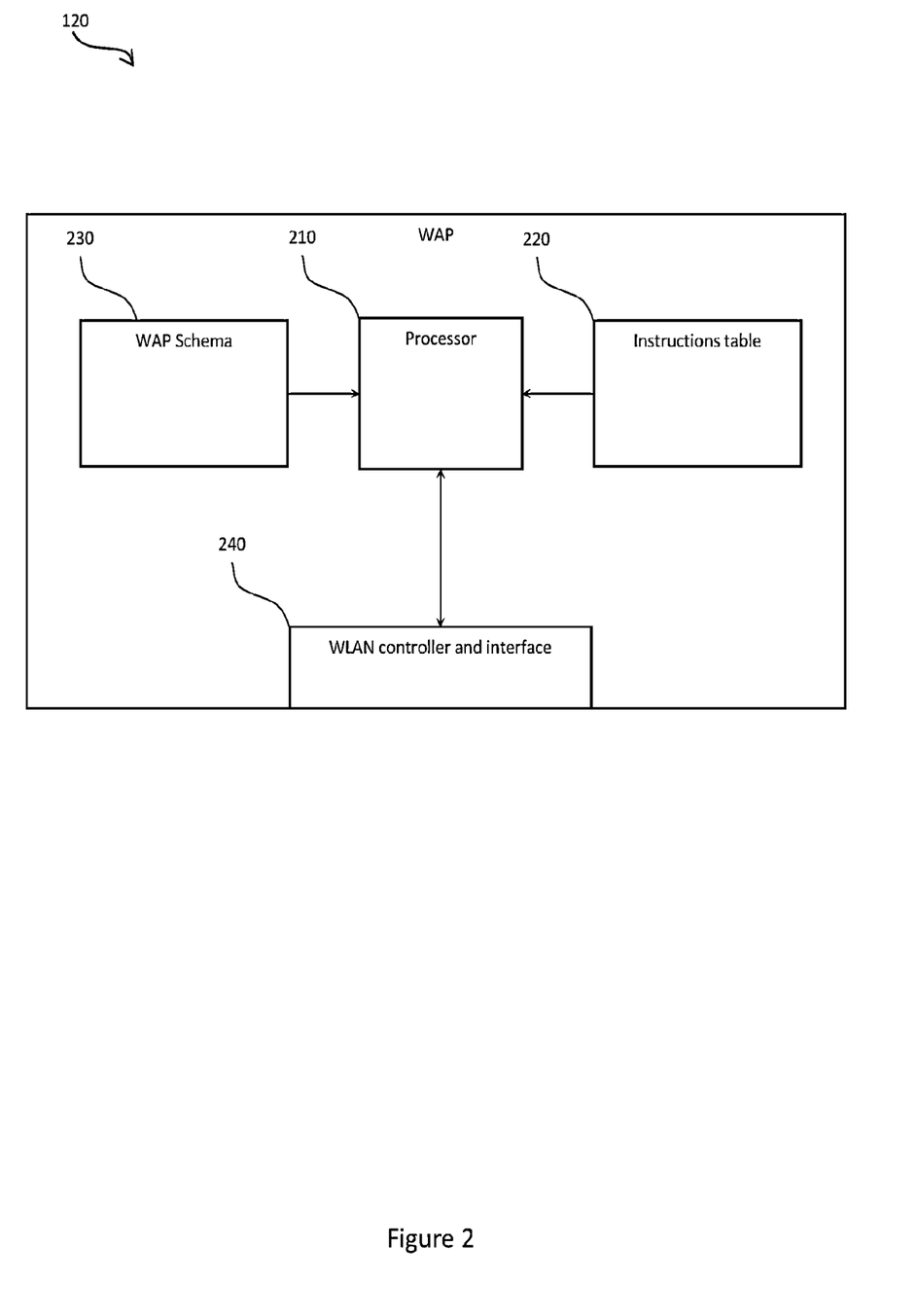
FIG. 2 is a schematic diagram of a Wireless Access Point of the wireless telecommunications network.

In more detail, and with reference to FIG. 2, the WAP 120 comprises a/an: processor 210; WAP instructions table 220; WAP Schema 230; and WLAN controller and interface 240.

The instructions table 220 provides a one-to-one association between a UE-executable instruction and a unique instruction code. An exemplary WAP instructions table is provided in Table 1, as follows:

TABLE 1

| UE-executable instruction | Instruction Code |
| --- | --- |
| No instructions | 6a |
| Reboot | L % |

TABLE 1-continued

| UE-executable instruction | Instruction Code |
| --- | --- |
| Update | aH |
| Sleep | 59 |
| Reset network configurations | #p |

The WAP Schema 230 comprises a mapping that associates a unique identifier (discoverable by the WAP, and for example a Media Access Control address) of each of the UEs 110 and a unique SSID character slot assigned to each UE. An exemplary WAP Scheme 230 is provided in Table 2 below, as follows:

TABLE 2

| UE Unique Identifier | SSID Character Slot |
| --- | --- |
| ED-0F-CD-82-24-7F | 5-6 |
| 40-D5-A1-99-DE-28 | 7-8 |
| ED-0F-CD-82-24-7F | 9-10 |
| 40-D5-A1-99-DE-28 | 11-12 |
| ED-0F-CD-82-24-7F | 13-14 |
| 40-D5-A1-99-DE-28 | 15-16 |
| ED-0F-CD-82-24-7F | 17-18 |
| 40-D5-A1-99-DE-28 | 19-20 |

In Table 2, the first and second UEs are associated with the unique (MAC) identifiers "ED-0F-CD-82-24-7F" and "40-D5-A1-99-DE-28", respectively.

An SSID is a text string, and each character that forms this string may be serially and numerically indexed, for example in order from left to right. The index of each character is the character position. For example, an SSID in the form of a text string "HDU159L % 6a59aH #p6aaH" has 20 characters, and the character "L" is in the seventh character position (as the seventh character in the string from left to right). A character slot is a set of (at least one) character positions that are uniquely allocated to a given UE.

The WAP Schema is therefore a unique allocation of a unique set of SSID character slots to each UE. In the example of Table 2, the character slots that the UEs are allocated are non-overlapping characters of two sequential character positions, although it will be appreciated that partially-overlapping character slots are available to be used, especially where characters of instruction codes overlap.

Accordingly, using the information in the WAP Instruction Table and the WAP Schema, an SSID may be generated such that an instruction code may be embedded within the SSID in a slot allocated to an intended target UE of that instruction code.

The WLAN controller and interface 240 comprises a communication interface for establishing the WLAN 140, as well as a controller for controlling operation of said interface, and in particular for configuring, and causing broadcasting of, the SSID of the WLAN.

The processor 210 is in communication with the WAP instructions table 220, WAP Schema 230, and the WLAN controller and interface 240 (comprising, at least, a wireless transceiver).

Figure 3:
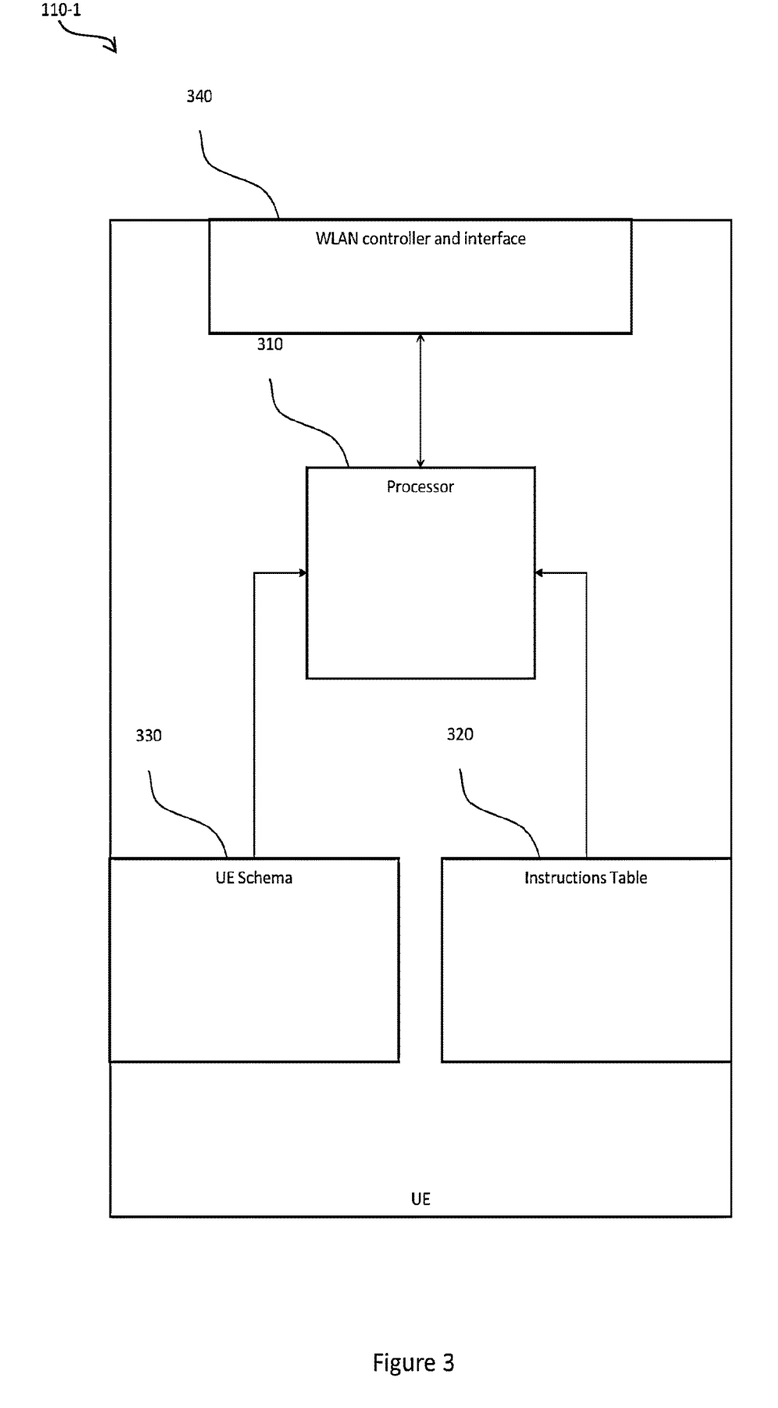
FIG. 3 is a schematic diagram of a User Equipment device of the wireless telecommunications network.

In more detail, and with reference to FIG. 3, the first UE 110-1 comprises a/an: processor 310; UE instructions table 320; UE Schema 230; and WLAN controller and interface 340.

The UE instructions table 320 and UE Schema comprise all or part of (and, at least, information that pertains to the UE itself) the WAP Instructions table 220 and WAP Schema 230, respectively.

The UE Schema 230 comprises character slots associated with UE 110-1, and therefore defines which characters in a broadcast SSID the UE 110-1 is to process for retrieval of an instruction code for the UE. Accordingly, to the extent that the UE and the WAP comprise the same information, then an SSID may be used to communicate specific and targeted instructions to the UE.

The WLAN controller and interface 340 comprises a communication interface for utilising the WLAN 140, and in particular for detecting the SSID of the WLAN and for transmitting the unique identifier associated with the first UE, as well as a controller for controlling operation of said interface.

The second UE 110-2 comprises corresponding components, and is correspondingly configured, to that of the first UE 110-1.

For example, persisting with the examples of Tables 1 and 2, and the exemplary SSID string "HDU159L % 6a59aH #p6aaH", the first and second UEs are configured, by using the respective UE Schema and UE instructions table, to retrieve the instructions to sleep and reboot, respectively, since the characters in the SSID that are in the character slots allocated to each UE (i.e. 5-6 and 7-8, respectively) comprise instruction codes (i.e. "59" and "L %", respectively) that translate to these instructions.

It will be appreciated that the WAP 120 and the UEs 110 comprise further components to those shown in and described with reference to FIGS. 1 to 3, as appropriate, but these further components have been omitted for conciseness.

Figure 4:
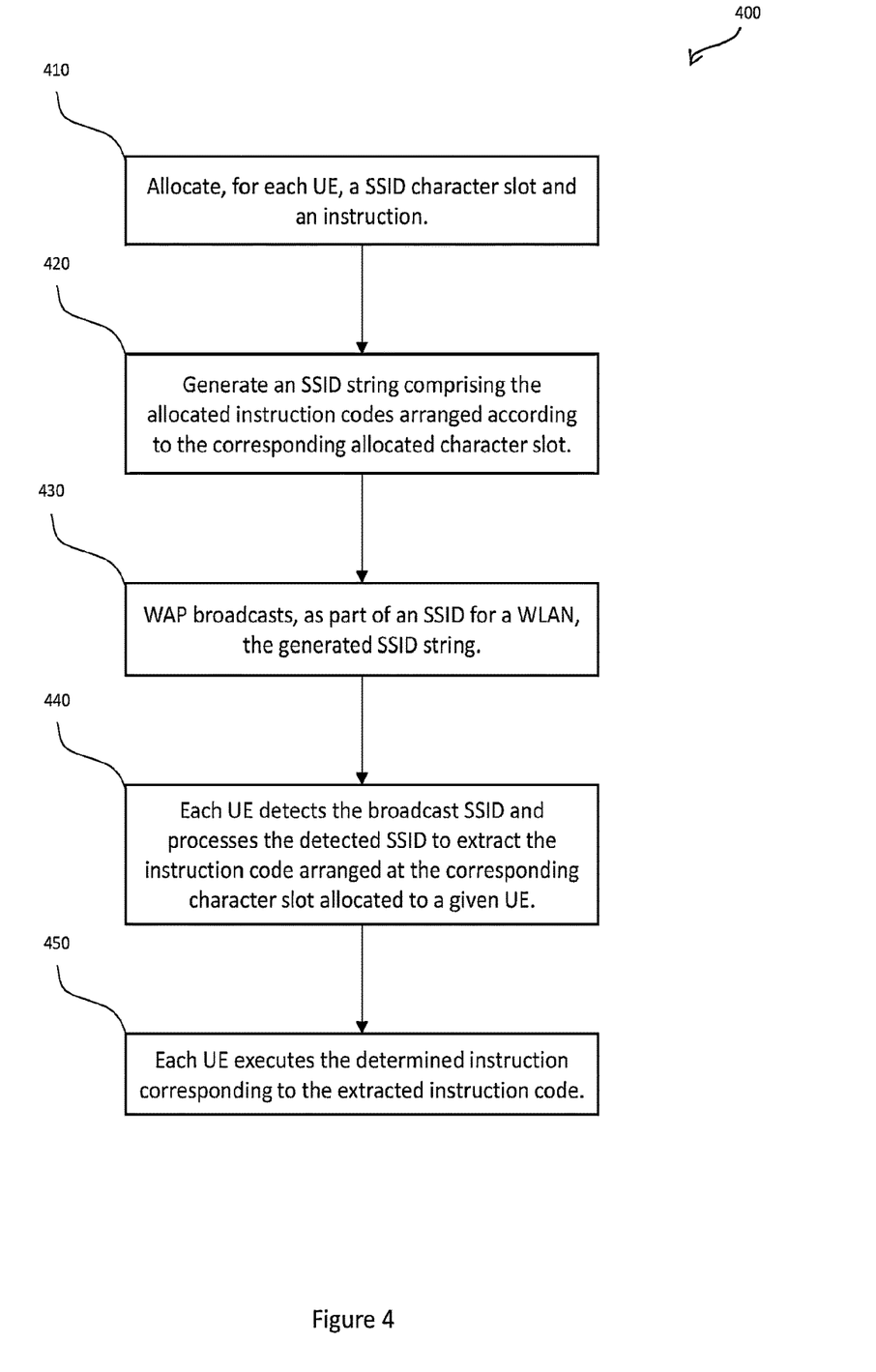
FIG. 4 shows a process for operating the wireless telecommunications network.

By means of the aforementioned components, the WAP and UEs are configured to communicate dedicated instructions to individual UEs, via broadcast SSIDs, using a principle of multiplexing and demultiplexing. FIG. 4 shows an exemplary process 400 for addressing different instructions to each of the UEs 110 in this way.

In a first step 410, instructions (and the corresponding instruction codes) are selected from the WAP instructions table 220 and are allocated to each UE 110 (in association with a unique identifier for each UE, as detected by the WAP).

Also at step 410, SSID character slots are allocated and co-ordinated, such that the character slot for a given UE is known to both that UE and the WAP. In one example, SSID character slots are predefined or are communicated by the WAP to UE (e.g. via a, or the, WLAN). Accordingly, the output of step 410 is a mapping associating each UE with a SSID character slot and an instruction code.

At step 420, all of the allocated instruction codes are compiled and arranged according to the sequence given by each associated character slot, thereby providing an SSID string. In this way, the SSID string is a string of instruction codes, within which the position of each instruction code matches the character slot of the UE to which the respective instruction code was allocated. Persisting with the example of Tables 1 and 2, Table 3 shows an example of the mapping of information used to derive the SSID string "HDU159L % 6a59aH #p6aaH".

TABLE 3

| UE Identifier | SSID Character Allocated Slot | Allocated Instruction | Instruction Code | Cumulative SSID String |
|---|---|---|---|---|
| ED-0F-CD-82-24-7F | 5-6 | Sleep | 59 | HDU159 |
| 40-D5-A1-99-DE-28 | 7-8 | Reboot | L % | HDU159L% |
| ED-0F-CD-82-24-7F | 9-10 | No instructions | 6a | HDU159L%6a |
| 40-D5-A1-99-DE-28 | 11-12 | Sleep | 59 | HDU159L%6a59 |
| ED-0F-CD-82-24-7F | 13-14 | Update | aH | HDU159L%6a59aH |
| 40-D5-A1-99-DE-28 | 15-16 | Reset network configurations | #p | HDU159L%6a59aH#p |
| ED-0F-CD-82-24-7F | 17-18 | No instructions | 6a | HDU159L%6a59aH#p6a |
| 40-D5-A1-99-DE-28 | 19-20 | Update | aH | HDU159L%6a59aH#p6aaH |

At a next step 430, the generated SSID string is communicated to the processor 210, which causes broadcasting of an SSID, for the WLAN 140, comprising the generated SSID string as generated following step 420.

At subsequent step 440, each of the UEs 110 detects the broadcast SSID. Based on the information in each UE Schema, each UE determines the character slot allocated to itself and then determines the characters in the detected SSID that correspond to said character slot. The determined characters are extracted and are interpreted as the instruction code for that UE. In turn, using the information in the UE Instruction Table, each UE then decodes the instruction code into the instruction, and then executes the instruction 450.

In this way, a single SSID may be used to communicate different specific instructions to a plurality of UEs, thereby alleviating the need to transmit instructions to the UEs via a communication link using data packets over the WLAN 140.

Where the underlying instructions and/or character slots are secret (i.e. known only to the WAP and appropriate UEs), process 400 may also simultaneously achieve the result of concealing what instructions are being communicated, and/or to which UEs.

Alternatives and Modifications

In an alternative, the WLAN 140 is only visible to the UEs 110, which are forbidden or unable to connect to the WLAN. In this way, the WLAN merely serves, by means of its SSIDs, to communicate instructions to the UEs, rather than to serve as a conventional wireless data network.

In an alternative, step 410 and/or 420 are performed by a device that is remote from the WAP, and for example a Cloud-based Device Management System (DSM) that is in communication with the WAP via the wide area network 130. Accordingly, the processor 210; WAP Schema 230; and/or WAP Instructions table 220 are available to be provided as part of the remote device instead.

In an alternative, the SSID comprises the instruction codes and an appended pre-defined code (e.g. a prefix, such as "HDU1", and/or suffix) indicating to the UEs 110 the presence of an instruction code in the SSID for demultiplexing. Accordingly, for processing efficiency, the UEs, having been preconfigured to identify the appended pre-defined code, can identify which SSIDs contain an instruction code, and therefore which SSIDs to process according to step 440.

In an alternative, the instruction is instead, more generally, data or information, such as an alphanumeric or an ASCII symbol. As such, process 400 is available to be used to communicate unique information to each UE, such as network access credentials, and for example a password.

Although the example of FIG. 1 shows only two UEs, it will be appreciated that telecommunications network 100 is available to comprise more UEs, in which process 400 is performed so as to communicate unique sets of instruction to all such UEs. Furthermore, in an alternative, the first and/or second UEs is, or are each, instead a set of a plurality of UEs having the same character slot, and therefore all deriving the same instruction.

The character slot allocated to a UE is available to be dynamically changed, rather than static. In one example, a change in character slot is communicated to the UE by the WAP 140 by means of a SSID, for example as an instruction code. In another example, the SSID string "UE1_8-9-UE2_12-15" may be interpreted by the first and second UEs to assign (as recorded in the respective Schemas 330) to themselves character slots 8-9 and 12-15, respectively.

In one example, the instruction codes are available to be converted into an encrypted string for broadcasting as part of the SSID, and the UEs are configured, at step 440, also to decrypt the encrypted string so as to output the instruction code. In one example, encryption keys are common to all UEs 110.

In an alternative, the encryption keys are unique to each UE 110. In this case, a given UE is available to sacrifice having prior knowledge of its allocated character slot, therefore avoiding having to ensure correspondent knowledge of allocated character slots by the WAP and UE. In this case, step 440 is modified such that every UE performs decryption upon the SSID. Where such decryption yields a valid instruction code (i.e. corresponding to an entry in the UE Instruction table), then that UE knows it has successfully identified an instruction intended for itself, and therefore also identifies the character slot allocated to that UE.

Instances may arise where an instruction code is unintentionally communicated to an unintended target UE; this may be done accidentally or maliciously (e.g. SSID spoofing). To help reduce this risk, at least the following actions may be adopted:
1. rapid changes to allocated character slots so as to minimise a duration any one character slot is allocated to a UE;
2. instruction codes are for one-time use, and are burned (i.e. never repeated) after being broadcast and/or processed by a UE;
3. randomly and secretly allocating character slots to UEs;
4. securely communicating character slots to the WAP and the UEs;
5. preventing execution of instruction codes by a UE, upon the UE detecting multiple SSIDs having (the same or different) instruction codes arranged at the character slot allocated to said UE; and/or 6. the UE authenticating a WAP, and executing instructions derived from an SSID broadcast only by an authenticated WAP.

It will be appreciated that character slots may additionally or alternatively have: at least one character position, but one less than the character limit for an SSID; different lengths for different UEs; non-adjacent character positions; be separated by at least one buffer character position.

Each feature disclosed herein, and (where appropriate) as part of the claims and drawings may be provided independently or in any appropriate combination.

Any reference numerals appearing in the claims are for illustration only and shall not limit the scope of the claims.

The invention claimed is:

1. A method of operating a wireless telecommunications network, said network comprising a plurality of User Equipment, UEs, a Wireless Access Point, WAP, and a Wireless Local Area Network, WLAN, provided by means of the WAP, the method comprising the steps of:
   associating, against each of the plurality of UEs, an item of information and a unique character slot for the item of information;
   compiling each item of information into a string, wherein said items of information are arranged according to each associated character slot;
   broadcasting, by means of the WAP, a network identifier for the WLAN, said network identifier comprising the compiled string;
   identifying, by means of each of the UEs, the broadcast network identifier;
   retrieving, by means of each UE, the character slot for the associated UE; and
   using, by means of each UE, the retrieved character slot so as to extract the associated item of information from the identified network identifier.

2. A method according to claim 1, wherein the, or each, UE extracts only the item of information associated therewith by using only the associated unique character slot.

3. A method according to claim 1, wherein retrieving the character slot comprises receiving a communication specifying said character slot from the WAP and/or via the, or another, WLAN.

4. A method according to claim 1, wherein each item of information associated with each of the UEs is different.

5. A method according to claim 1, wherein the network identifier comprises a given item of information in an encoded form suitable for decoding by the associated UE.

6. A method according to claim 1, further comprising:
   encrypting at least one of the items of information into an encrypted form, wherein the broadcast network identifier comprises said encrypted form; and
   decrypting said encrypted form by the associated UE so as to extract the associated item of information.

7. A method according to claim 6, wherein the decryption is performed using a decryption key common to all of the plurality of UEs.

8. A method according to claim 6, wherein the decryption is performed using a decryption key that is unique to the, or each, UE.

9. A method according to claim 8, wherein the, or each, UE stores predefined information comprising the item of information associated with said UE/s, and wherein the step of retrieving the character slot for the associated UE comprises identifying the character slots of the network identifier that are decrypted to generate the item of information as stored in the predefined information.

10. A method according to claim 1, wherein the item of information comprises an instruction for the UE/s.

11. A method according to claim 1, wherein the method is performed without the, or each, UE connecting, or being connected, to the, or any, WLAN.

12. A method according to claim 1, wherein the network identifier is a Service Set Identifier.

13. A method of operating a Wireless Access Point, WAP, for a wireless telecommunications network, said network comprising a plurality of User Equipment, UEs, and a Wireless Local Area Network, WLAN, provided by means of the WAP, the method comprising the steps of:
   receiving an association, against each of the plurality of UEs, between an item of information and a unique character slot for the item of information;
   compiling each item of information into a string, wherein said items of information are arranged according to each associated character slot;
   broadcasting, by means of the WAP, a network identifier for the WLAN, said network identifier comprising the compiled string, so that each UE, having retrieved, and by using, the character slot for the associated UE, extracts the associated item of information from the broadcast network identifier.

14. A method of operating User Equipment, UE, for a wireless telecommunications network, said network comprising a plurality of User Equipment, a Wireless Access Point, WAP, and a Wireless Local Area Network, WLAN, provided by means of the WAP, and the wireless telecommunications network being configured to:
   associate, against the, and each, UE, an item of information and a unique character slot for the item of information;
   compile each item of information into a string, wherein said items of information are arranged according to each associated character slot; and
   broadcast a network identifier for the WLAN, said network identifier comprising the compiled string;
wherein the method comprises the steps of the UE:
   identifying the broadcast network identifier;
   retrieving the character slot associated with the UE; and
   using the retrieved character slot so as to extract the associated item of information from the identified network identifier.

15. A non-transitory computer-readable carrier medium comprising a computer program, which, when the computer program is executed by a computer, causes the computer to carry out the steps of claim 1.

16. A wireless telecommunications network comprising:
   a plurality of User Equipment, UEs;
   a processor configured to associate, against each of the plurality of UEs, an item of information and a unique character slot for the item of information;
   a Wireless Access Point, WAP, configured to:
     compile each item of information into a string, wherein said items of information are arranged according to each associated character slot; and
     broadcast a network identifier, said network identifier comprising the compiled string;
   a Wireless Local Area Network, WLAN, provided by means of the WAP and having the network identifier associated therewith; and wherein each of the plurality of UEs is further configured to:
    identify the broadcast network identifier;
    retrieve the character slot for the associated UE; and
    use the retrieved character slot so as to extract the associated item of information from the identified network identifier.

17. A Wireless Access Point, WAP, for a wireless telecommunications network, said network comprising a plurality of User Equipment, UEs, and a Wireless Local Area Network, WLAN, provided by means of the WAP, the WAP comprising:
    a processor configured to:
        receive an association, against each of the plurality of UEs, between an item of information and a unique character slot for the item of information; and
        compile each item of information into a string, wherein said items of information are arranged according to each associated character slot; and
    a controller configured to:
        broadcast, by means of the WAP, a network identifier for the WLAN, said network identifier comprising the compiled string, so that each UE, having retrieved, and by using, the character slot for the associated UE, extracts the associated item of information from said broadcast network identifier.

18. User Equipment, UE, for operating within a wireless telecommunications network, said network comprising a plurality of UEs, a Wireless Access Point, WAP, and a Wireless Local Area Network, WLAN, provided by means of the WAP, and the wireless telecommunications network being configured to:
    associate, against the, and each, UE, an item of information and a unique character slot for the item of information;
    compile each item of information into a string, wherein said items of information are arranged according to each associated character slot; and
    broadcast a network identifier for the WLAN, said network identifier comprising the compiled string; and
    wherein the UE comprises:
        a processor configured to:
            identify the broadcast network identifier;
            retrieve the character slot associated with the UE; and
            use the retrieved character slot so as to extract the associated item of information from the identified network identifier.

\* \* \* \* \*